United States Patent
Anderson et al.

(10) Patent No.: US 12,009,604 B2
(45) Date of Patent: Jun. 11, 2024

(54) VISUAL ANTENNA AIMING

(71) Applicant: Cisco Technology, Inc., San Jose, CA (US)

(72) Inventors: Fred J. Anderson, Lakeville, OH (US); Jonathan M. Cyphert, Richfield, OH (US); John M. Swartz, Lithia, FL (US); Daniel N. Johnson, Louisville, OH (US); Danielle N. Bane, Cleveland, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/813,679

(22) Filed: Jul. 20, 2022

(65) Prior Publication Data

US 2024/0030599 A1 Jan. 25, 2024

(51) Int. Cl.
*H01Q 3/34* (2006.01)
*H01Q 1/22* (2006.01)
*H01Q 15/02* (2006.01)

(52) U.S. Cl.
CPC .............. *H01Q 3/34* (2013.01); *H01Q 1/22* (2013.01); *H01Q 15/02* (2013.01)

(58) Field of Classification Search
CPC .. H01Q 1/22; H01Q 3/34; H01Q 3/02; H01Q 15/02; H04B 7/04; H04B 7/06
See application file for complete search history.

(56) References Cited

U.S. PATENT DOCUMENTS

| | | | |
|---|---|---|---|
| 9,400,170 B2 * | 7/2016 | Steffey | G01B 11/002 |
| 2004/0067787 A1 | 4/2004 | Terashima et al. | |
| 2014/0226968 A1 | 8/2014 | Cook | |
| 2016/0380347 A1 | 12/2016 | Grabert | |
| 2019/0173168 A1 | 6/2019 | Rowell | |
| 2021/0356837 A1 * | 11/2021 | Shin | G01S 7/4812 |

FOREIGN PATENT DOCUMENTS

| | | | |
|---|---|---|---|
| CN | 112673273 A | * | 4/2021 |
| EP | 2768253 A1 | | 8/2014 |

OTHER PUBLICATIONS

"Antenna Alignment Tools," Sunsight Alignment Solutions, Year: 2022 <https://www.sunsight.com/products/antenna-alignment-tools/?gclid=Cj0KCQiAxc6PBhCEARIsAH8Hff1pdNIHi8BdNQ4GQfe2GAUQ8Ci6-VMAgWo2lvtSUVdAsoDqmsTO1saAjp4EALw_wcB>.

(Continued)

*Primary Examiner* — Tho G Phan
(74) *Attorney, Agent, or Firm* — Patterson + Sheridan, LLP

(57) ABSTRACT

Embodiments herein describe mounting one or more lasers onto an AP to generate a laser pattern on a surface representing the coverage area of an antenna in the AP. In one embodiment, the antenna is a steerable antenna that can be electronically or mechanical steered to point to different directions (without moving the AP as a whole). The laser or lasers can be used to visualize the coverage area of the steerable antenna when pointing in different directions. Advantageously, a technician can use the laser or lasers to identify a location where, if steered, the antenna would provide the desired coverage area. The technician can then steer the antenna to point in that direction to provide the desired radio frequency (RF) coverage.

20 Claims, 8 Drawing Sheets

(56) References Cited

OTHER PUBLICATIONS

"3Z RF Vision: Antenna Alignment Tool," Command the Network, Year: 2022 <https://www.viavisolutions.com/en-us/products/3z-rf-vision?utm_medium=cpc&utm_campaign=5G-Contractors&utm_source=google&utm_term=%7bterm%7d&utm_content=ad&gclid=Cj0KCQiAxc6PBhCEARIsAH8Hff2Kip9N9b8ykuQ3V5lyQ573OxujCmkAwCQVeKN-RWYiSIYPIrEsfk8aAr15EALw_wcB>.

AintBigAintClever. "Ubiquiti Nanostation Alignment—Using a Laser." YouTube, YouTube, May 27, 2014, https://www.youtube.com/watch?v=RSiutVIL0tM.

Fordham J.A., et al., "Precision Positioner Alignment Techniques for Spherical near Field Antenna Measurements Using Laser Alignment Tools", Microwave Instrumentation Technologies, LLC, Year: 2000, pp. 1-4.

* cited by examiner

VISUAL ANTENNA AIMING

TECHNICAL FIELD

Embodiments presented in this disclosure generally relate to using one or more lasers mounted to an access point (AP) to visual represent a coverage area of an antenna.

BACKGROUND

Mounting APs to provide adequate coverage areas is difficult, especially in large public venues. In most commercial settings, APs can be mounted a certain distance apart which generally guarantees there are no dead zones or coverage gaps. However, in large public venues where APs can be mounted hundreds of feet in the air (e.g., in the rafters of a stadium or venue), it is much more difficult to determine whether the antennas in the APs provide a coverage area with gaps or dead zones. When installing an AP in the ceiling of a large public venue, the installer may have to guess or rely on someone of the ground with a testing device to identify whether there are any gaps in the coverage areas between neighboring APs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
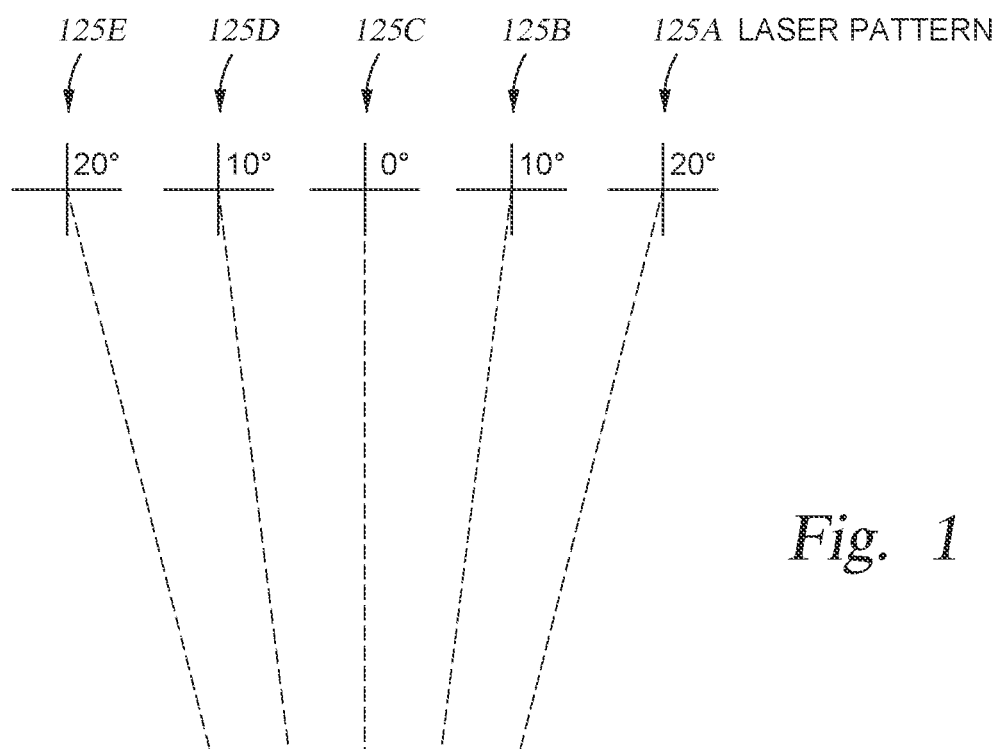
FIG. 1 illustrates mounting multiple lasers to an AP with a steerable antenna, according to one embodiment.
Figure 1:
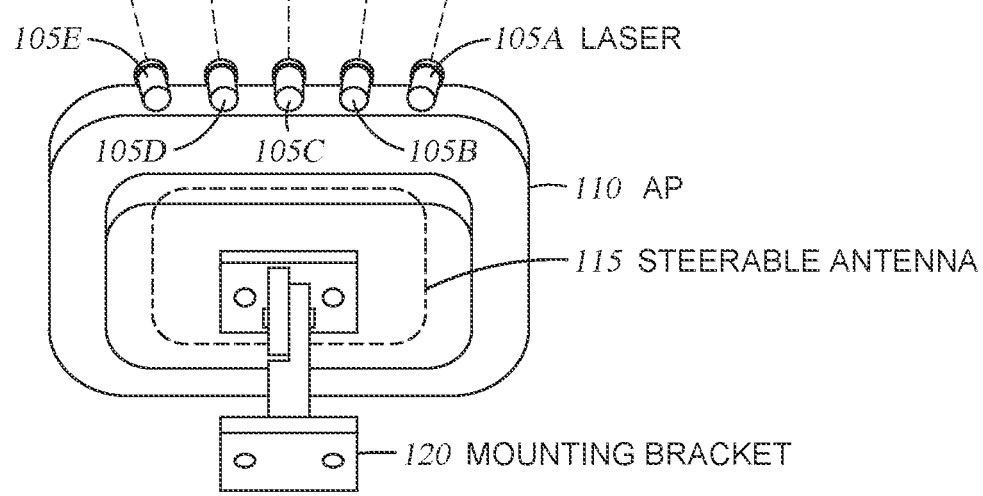

One embodiment presented in this disclosure is a method that includes mounting an access point (AP) to a structure, the AP comprising a steerable antenna and a plurality of lasers oriented in different directions relative to the AP, activating a first laser of the plurality of lasers, wherein the first laser projects light on a first surface to provide a visual indication of a first location of a coverage area of the steerable antenna when steered in a same direction as the first laser, activating a second laser of the plurality of lasers where the second laser projects light on a second surface to provide a visual indication of a second location of the coverage area of the steerable antenna when steered in a same direction as the second laser, and steering the steerable antenna to change the location of the coverage area after activating the first and second lasers.

Another embodiment presented in this disclosure is a method that includes mounting an access point (AP) to a structure where the AP includes a steerable antenna and a laser, activating the laser when having a first orientation relative to the AP where the laser projects light on a surface to provide a visual indication of a location of a coverage area of the steerable antenna when steered in a same direction as the laser, adjusting the laser to have a second orientation relative to the AP, and steering the steerable antenna to change the location of the coverage area after adjusting the laser.

Another embodiment presented in this disclosure is a system that includes an AP comprising a steerable antenna and a first laser mounted on the AP where the first laser has an orientation relative to the AP such that, when activated, the first laser projects light on a first surface to provide a visual indication of a first location of a coverage area of the steerable antenna when steered in a same direction as the first laser. The system includes a second laser mounted on the AP where the second laser has an orientation relative to the AP such that, when activated, the second laser projects light on a second surface to provide a visual indication of a second location of the coverage area of the steerable antenna when steered in a same direction as the second laser.

EXAMPLE EMBODIMENTS

Embodiments herein describe mounting one or more lasers onto an AP to generate a laser pattern on a surface representing the coverage area of an antenna in the AP. In one embodiment, the antenna is a steerable antenna that can be electronically or mechanical steered to point to different directions (without moving the AP as a whole). The laser or lasers can be used to visualize the coverage area of the steerable antenna when pointing in different directions. Advantageously, a technician can use the laser or lasers to identify a location where, if steered, the antenna would provide the desired coverage area. The technician can then steer the antenna to point in that direction to provide the desired radio frequency (RF) coverage. Doing so means the technician no longer has to guess whether the current direction of the antenna provides a sufficient coverage area, or having to test whether the coverage area is suitable.

FIG. 1 illustrates mounting multiple lasers 105 to an AP 110 with a steerable antenna 115, according to one embodiment. In this example, five lasers 105A-105E are mounted on a surface of the AP 110. The lasers 105 are mounted onto the AP such that when activated they output laser patterns that correspond to different directions in which the steerable antenna 115 can be steered. That is, the laser patterns are visual indications of the location (and potentially the size) of the coverage area of the steerable antenna 115 when steered in those directions. In this example, the laser 105A emits a laser pattern 125A that corresponds to the steerable antenna 115 being directed 20 degrees to the right of a center axis (or zero position) of the AP 110. The laser 105B emits a laser pattern 125B that corresponds to the steerable antenna 115 being directed 10 degrees to the right of a center axis of the AP 110. The laser 105C emits a laser pattern 125C that corresponds to the steerable antenna 115 being directed in the same direction as the center axis of the AP 110. The laser 105D emits a laser pattern 125D that corresponds to the steerable antenna 115 being directed 10 degrees to the left of a center axis of the AP 110. The laser 105E emits a laser pattern 125E that corresponds to the steerable antenna 115 being directed 20 degrees to the left of a center axis of the AP 110.

In one embodiment, the center of the laser patterns 125 (a crosshair pattern in this example) may correspond to the center of the coverage area of the antenna 115 when pointed in that direction. Further, the lengths of the vertical and horizontal bars forming the cross hairs may be set to represent the area of the coverage area of the antenna 115. For instance, the ends of the vertical and horizontal bars may indicate the boundary of the main lobe (e.g., the 3 dB points corresponding to the main lobe) of the antenna 115. Thus, by activating the lasers 105, the technician can use the laser patterns 125 to see the coverage area of the antenna when it is steered to point in the same direction as the corresponding laser 105. The technician can then determine whether this would yield the desired coverage area, and if so, steer the antenna 115 to point in the same direction as the laser 105.

As an example installation scenario, a technician may be mounting the AP 110 in the ceiling of a large public venue such as a stadium, concert hall, auditorium, etc. The AP 110 may face in a downward direction such that the laser patterns 125 are displayed on the floor or other surface of the venue (e.g., a seating area, concession area, stage, waiting area, entrance, etc.). The technician can activate one or all of the lasers 105 to determine which of the laser patterns 125 corresponds to the most desired coverage area. For example, the technician may be mounting multiple APs in the venue which each have lasers mounted thereon. The technician can identify the laser on one AP that has a crosshair pattern that touches (or slightly overlaps) with the crosshair pattern of a laser on a neighboring AP. This indicates that if the steerable antennas on these APs were adjusted in the same direction as the lasers, the antennas would have coverage areas that touch or slightly overlap, thereby generating an overall coverage area that does not have gaps or dead spots between the APs. In this manner, the embodiments herein can be used to generate an overall coverage area generated using multiple APs with little or no coverage gaps.

In one embodiment, the steerable antenna 115 is an electronically steerable antenna. That is, the AP 110 can steer the antenna in any of the same directions as the lasers 105 without having to physical move the antenna 115 or the AP 110. In another embodiment, the steerable antenna 115 is a mechanically or physically steerable antenna. For example, the AP 110 may include one or more actuators for steering the antenna 115 to point in any of the same directions as the lasers 105. The actuators can move the antenna 115 to point in a different direction without moving the AP 110. That is, the casing or housing of the AP 110 may not change or move when steering the antenna 115.

In one embodiment, the steerable antenna 115 may be adjustable in the Y (vertical) direction as well as the X (horizontal) direction as shown in FIG. 1. In that case, the AP 110 can include another set (or sets) of lasers to represent coverage areas of the steerable antenna 115 in the Y direction. For example, the AP 110 may include three sets of five lasers where a first set represents five different horizontal coverage areas of the AP 110 when the antenna 115 has a 15 degree vertical tilt in one direction, a second set of lasers that represent five different horizontal coverage areas of the AP 110 when the antenna 115 has no vertical tilt, and a third set of lasers that represent five different horizontal coverage areas of the AP 110 when the antenna 115 has a 15 degree vertical tilt in the opposite direction. Thus, the lasers 105 can represent coverage areas of the antenna when it is adjustable along two perpendicular axes (e.g., both the horizontal (X) and vertical (Y) directions).

In another example, the same five lasers 105 shown in FIG. 1 may be used to represent different vertical tilts of the steerable antenna 115. For example, instead of the lasers 105 being unable to move, the technician may be able to tilt each laser 105 in the Y direction, both upwards and downwards. When titled up, the lasers 105 represent a 15 degree vertical tilt of the antenna 115 in one direction and when tilted down, the lasers 105 represent a 15 degree vertical tilt of the antenna 115 in the opposite direction.

In one embodiment, the AP 110 may have multiple steerable antennas 115.

The antennas 115 may disposed close enough in the AP that the same set of lasers 105 can be used to represent the coverage areas of multiple steerable antennas in the same AP. For example, to avoid coverage gaps, a first steerable antenna 115 in the AP 110 may be set at 10 degrees to the right of the center axis (corresponding to the laser 105B) while a second steerable antenna 115 in the AP 110 is set at 20 degrees to the left of the center axis (corresponding to the laser 105E). These directions can also be set in consideration of the coverage areas of antennas in other APs that may be part of the same installation as discussed above.

The AP 110 also includes a mounting bracket 120 for attaching the AP to a structure in the installation site (e.g., a rafter or I beam in the venue). In one embodiment, the coverage area of the steerable antenna 115 may be set without adjusting the mounting bracket 120, or in other words, without adjusting the center axis of the AP 110. In that case, the steerable antenna 115 can be adjusted to ensure there are no coverage gaps with the coverage areas provided by neighboring APs in the venue. However, in other installations, the technician may also adjust the center axis of the AP 110 by adjusting the mounting bracket 120. For example, after initially mounting the AP 110 to a structure, the technician may see that there is a gap between the neighboring AP to the right, even if the antenna 115 is adjusted to point in the direction of the laser 105A. Put differently, the antenna 115 may not be steerable enough to move its coverage area sufficiently to the right to meet or overlap with a neighboring coverage area. In that case, the technician may adjust the steerable antenna of the neighboring AP (if that is possible), or adjust the mounting bracket 120 to point the center axis of the AP 110 further to the right so that the antenna 115 can be adjusted to remove the coverage gap.

The mounting bracket 120 can be a fixed bracket (which is non-adjustable) or can provide one-axis or two-axes of adjustment. For example, the technician may be able to adjust the bracket 120 to move the center axis of the AP 110 in the X direction (e.g., horizontally) or the Y direction (e.g., vertically). Doing so then changes the directions of the lasers 105 and the different directions in which the antenna 115 can be steered.

Further, in one embodiment, the lasers 105 represent only a sub-portion of the different directions in which the antenna 115 can be steered. That is, the lasers 105A-E in FIG. 1 provide a visual representation of the coverage area of the antenna 115 in five different directions, but the antenna 115 may be steerable in many other directions. For example, the antenna 115 may be able to be steered at directions 5, 10, 15, and 20 degrees to the left and right of the center axis (or with even smaller granularity). It may be sufficient for the laser 105 to visually represent a sub-portion of the possible steerable directions of the antenna 115 for the technician to eliminate gaps between coverage areas in neighboring APs (or multiple antennas in the same AP).

Figure 2:
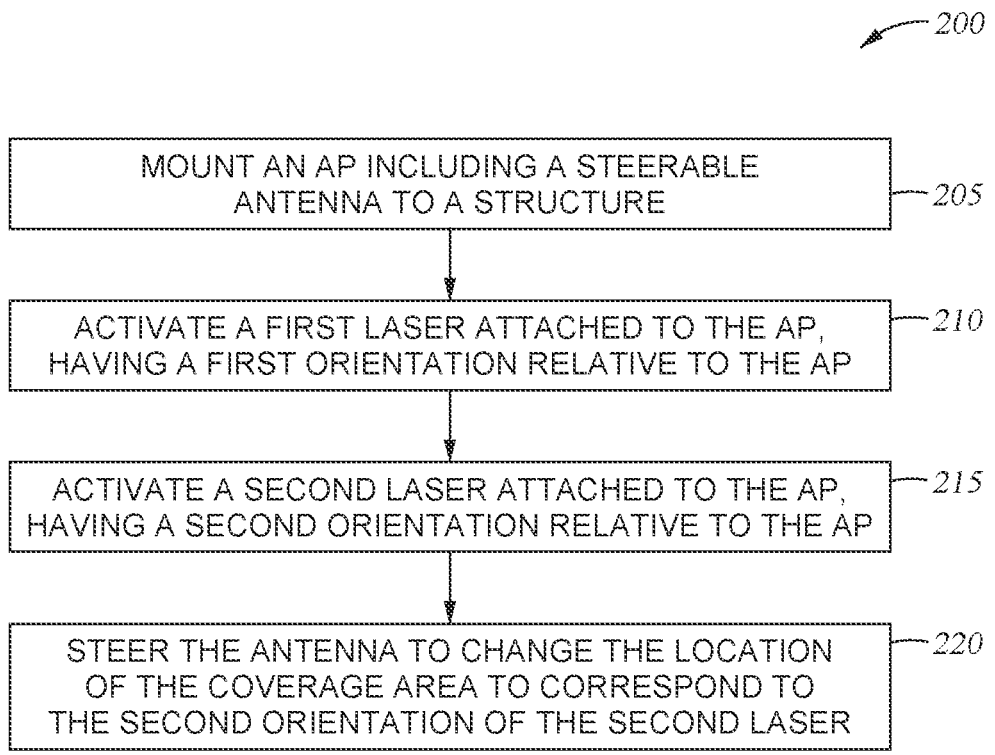
FIG. 2 is flowchart for using multiple lasers to adjust a steerable antenna, according to one embodiment.

FIG. 2 is flowchart of a method 200 for using multiple lasers to adjust a steerable antenna, according to one embodiment. At block 205, a technician mounts an AP including a steerable antenna to a structure. The method 200 assumes a system similar to the one shown in FIG. 1 where the AP has at least one steerable antenna (but could have more) and multiple lasers that are mounted on the AP where each laser outputs a laser pattern that visually represents the location of a coverage area of the antenna when pointed in different directions.

While the embodiments herein are primarily discussed in the context of large public venues, they are not limited to such. The embodiments herein can be used in office settings, educational institutions, shopping centers, outdoor areas, and the like. to visualize the coverage areas of a steerable antenna in an AP. Further, the embodiments herein can also be used for an AP that does not have a steerable antenna. In that case, the mounting bracket (e.g., the mounting bracket 120) can be used to move or reorient that AP as whole in response to the visualization provided by the lasers mounted on the AP.

At block 210, the technician activates a first laser attached to the AP, having a first orientation relative to the AP. In one embodiment, each laser attached to the AP points in a different direction relative to a center axis of the AP. Further, each laser can point in a direction that corresponds to a directional setting of the steerable antenna in the AP, as shown in FIG. 1.

After activating the first laser, the technician can evaluate its laser pattern to estimate whether the steerable antenna would have a satisfactory coverage area if pointed in the same direction as the first laser. For example, the pattern of the first laser may point at a location that neighbors or slightly overlaps with a coverage area of a neighboring AP, thereby indicating there would be no coverage gaps between the APs. In another embodiment, the technician may want the coverage area to cover a particular location (e.g., VIP seating or a particular walkway in the venue), regardless whether there are coverage gaps between that coverage area and the coverage areas for neighboring APs.

The technician can manually activate the first laser by pressing an on switch on the first laser. Alternatively, the technician may use a portable device (e.g., a smart phone or tablet) that executes a software application for setting up the AP. The software application may provide an interface for turning on and off the lasers mounted on the AP. Thus, the technician does not need to be physically located at the AP in order to turn on and off the lasers.

At block 215, the technician activates a second laser attached to the AP which has a second orientation relative to the AP that is different than the orientation of the first laser. In one embodiment, block 215 is performed after the technician has activated the first laser at block 210 and determined that steering the antenna in its direction would not result in a satisfactory coverage area. In response, the technician then activates the second laser at block 215 to determine whether the antenna would have a satisfactory coverage area if steered to point in the same direction as the second laser. For example, the technician may deactivate the first laser and then activate the second laser.

However, in another embodiment, the technician may activate all the lasers on the AP simultaneously. That is, the first and second lasers may be activated in parallel (and any other lasers mounted on the AP). In this situation, rather than activating and deactivating each laser, the technician can activate multiple lasers and evaluate their laser patterns to see which represents the best coverage area for the steerable antenna. In either case, the method 200 assumes that the second laser has a laser pattern that corresponds to a satisfactory coverage area for the steerable antenna.

At block 220, the technician steers the antenna to change the location of its coverage area to correspond to the second orientation of the second laser. For example, when method 200 begins, the steerable antenna may be steered (either electronically or mechanically) to point in a direction corresponding to the orientation of the first laser. However, after the technician has compared the laser patterns of the first and second lasers and determined the laser pattern of the second laser corresponds to a better coverage area, the technician can then steer the antenna so its coverage area (e.g., its main lobe) faces in the same direction as the second laser.

The embodiments herein are not limited to any particular technique for steering the antenna. This can be done by the technician using an interface on the AP when the technician is at the location of the AP, or by using a software application on a portable device that is wirelessly connected to the AP. For example, the technician may not have to be at the physical location of the AP in order to adjust the steerable antenna.

The method 200 can be used to adjust multiple steerable antennas on the AP. The AP can have different sets of lasers, one set of lasers for each steerable antenna on the AP, or the same set of lasers may have laser patterns that represent the different directional settings of multiple steerable antennas. Further, the lasers may be fixed (i.e., non-adjustable) on the AP, or the lasers can be adjustable along one axis, e.g., to represent steering the antenna along two axes as discussed above.

Figure 3:
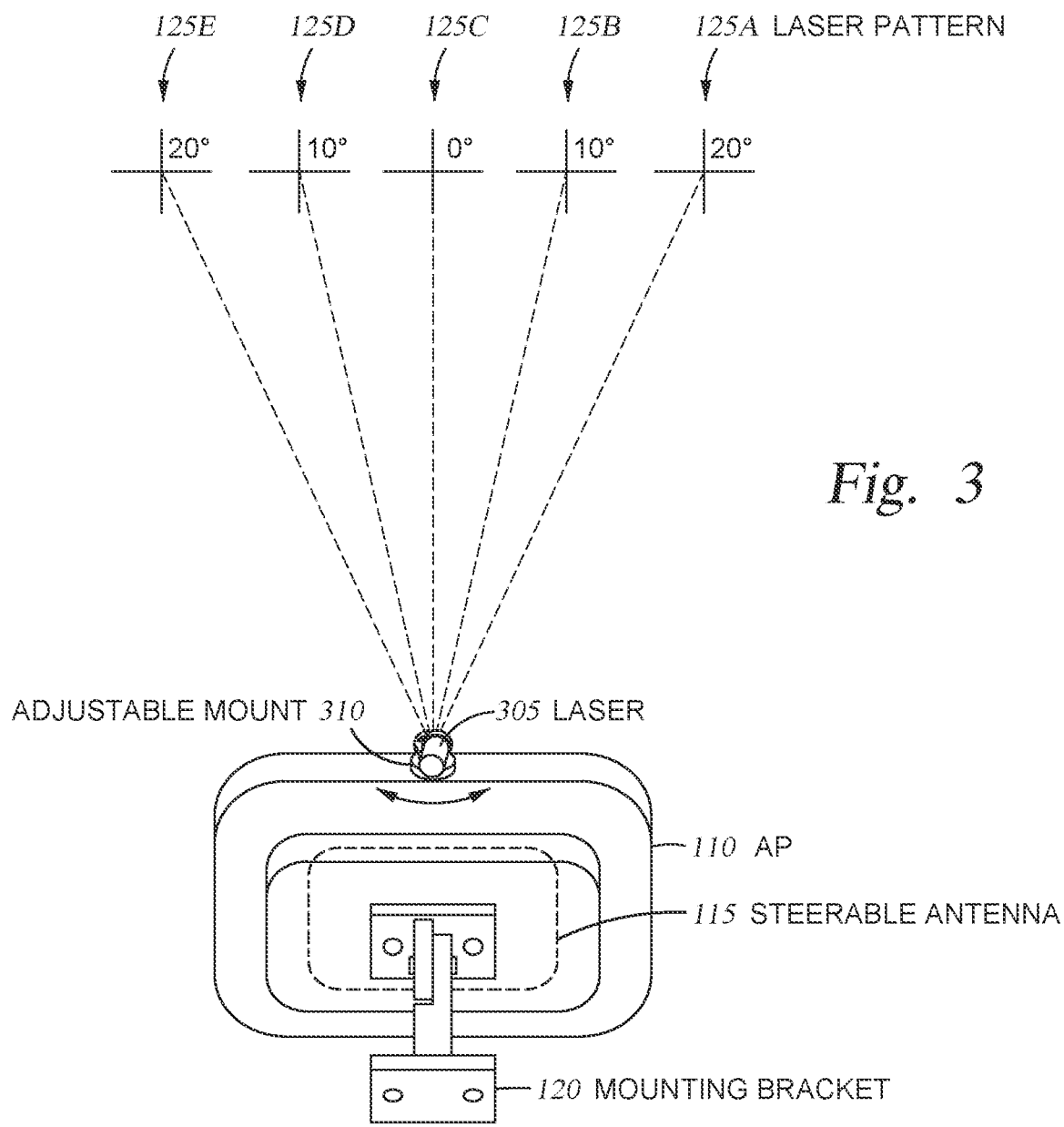
FIG. 3 illustrates mounting an adjustable laser to an AP with a steerable antenna, according to one embodiment.

FIG. 3 illustrates mounting an adjustable laser to an AP 110 with a steerable antenna 115, according to one embodiment. The AP 110 in FIG. 3 can have the same components as the AP 110 in FIG. 1 (e.g., steerable antenna 115 and the mounting bracket 120). However, instead of mounting multiple lasers to the AP as shown in FIG. 1, in FIG. 3, one laser 305 is mounted to the AP 110. In this embodiment, an adjustable mount 310 is used to mount the laser 305 onto the AP 110.

The mount can be any apparatus or device that permits the technician to change the orientation of the laser 305 so that the laser can generate the laser patterns 125. That is, using the adjustable mount 310, the laser 305 in FIG. 3 can generate the same laser patterns 125A-E that the lasers 105A-E generated in FIG. 1. While the technician could activate multiple lasers in FIG. 1 to output multiple laser patterns 125 simultaneously, in FIG. 3 the laser 305 may be able to output one laser pattern 125 at any given time. However, as discussed below in FIGS. 6A and 6B, a lens can be added to a laser so that a single laser can output laser patterns for different coverage areas of the steerable antenna 115 at the same time.

The adjustable mount 310 can be controlled by the technician or by using one or more actuators. In any case, the adjustable mount 310 can have predefined settings that orient the laser 305 to point in the directions shown in FIG. 3 to output the laser patterns 125. Each laser pattern 125 can correspond to a particular directional setting of the steerable antenna 115. In this example, the adjustable mount 310 has at least five settings where a first setting orients the laser 305 to output the laser pattern 125A, a second setting orients the laser 305 to output the laser pattern 125B, a third setting orients the laser 305 to output the laser pattern 125C, a fourth setting orients the laser 305 to output the laser pattern 125D, and a fifth setting orients the laser 305 to output the laser pattern 125E.

As in FIG. 1, the center of the laser patterns 125 (a crosshair pattern in this example) may correspond to the center of the coverage area of the antenna 115 when pointed in that direction. Further, the lengths of the vertical and horizontal bars may be controlled to represent the area of the coverage area of the antenna 115. For instance, the vertical and horizontal bars may indicate the main lobe (e.g., the 3 dB points corresponding to the main lobe) of the antenna 115.

In one embodiment, the steerable antenna 115 may be adjustable in the Y (vertical) direction as well as the X (horizontal) direction. In that case, the adjustable mount 310 can permit the laser 305 to move in both the vertical and horizontal axes. For example, the adjustable mount can be a ball and socket. Or the adjustable mount can have two separate pivoting elements: one for reorienting the laser 305 in the horizontal axis and another for reorienting the laser 305 in the vertical axis.

Like the AP 110 in FIG. 1, the AP 110 in FIG. 3 can have multiple steerable antennas 115. The antennas 115 may be disposed close enough in the AP that the same laser 305 can be used to represent the coverage areas of multiple steerable antennas in the same AP. Thus, the laser 305 can be used to visualize the coverage areas of multiple steerable antennas in the AP 110. Alternatively, the AP 110 may include a second laser that has a different adjustable mount for visualizing the coverage areas corresponding to a second steerable antenna.

Further, in one embodiment, the adjustable mount 310 may have predefined settings that represent only a sub-portion of the different directions in which the antenna 115 can be steered. That is, the laser 305 can provide a visual representation of the coverage area of the antenna 115 in five different directions, but the antenna 115 may be steerable in many different other directions. For example, the antenna 115 may be able to be steered at directions 5, 10, 15, and 20 degrees to the left and right of the center axis (or with even smaller granularity). It may be sufficient for the adjustable mount 310 to move the laser 305 to visually represent a sub-portion of the possible steerable directions of the antenna 115 for the technician to eliminate gaps between coverage areas in neighboring APs (or multiple antennas in the same AP).

Figure 4:
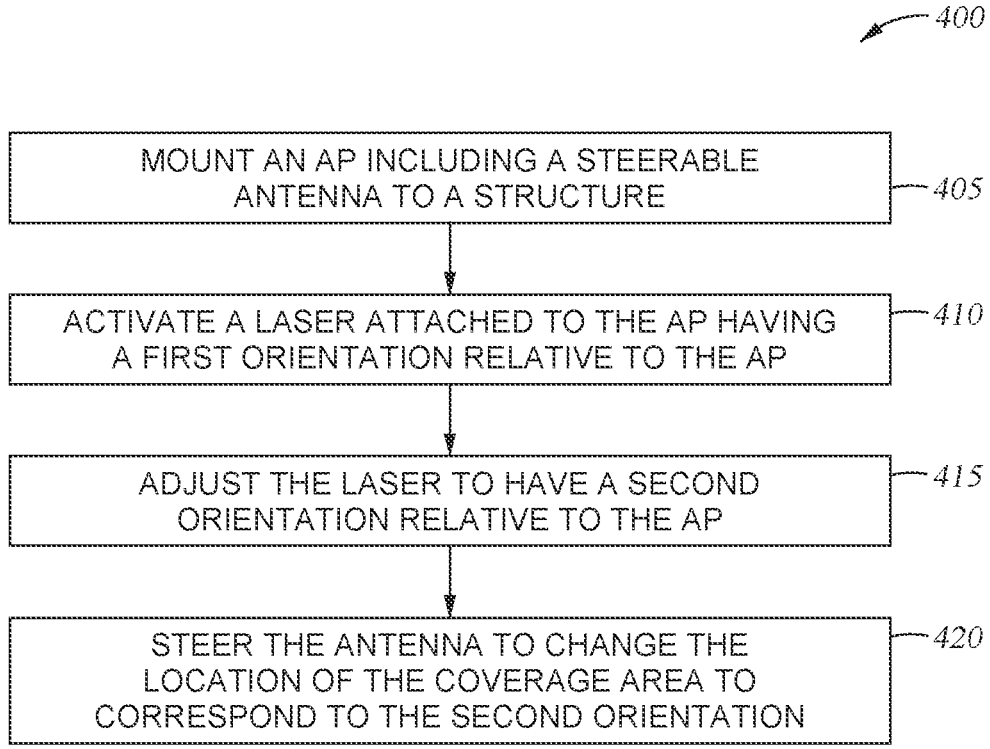
FIG. 4 is flowchart for using an adjustable laser to adjust a steerable antenna, according to one embodiment.

FIG. 4 is flowchart of a method 400 for using an adjustable laser to adjust a steerable antenna, according to one embodiment. At block 405 a technician mounts an AP including a steerable antenna to a structure. The method 400 assumes a system similar to the one shown in FIG. 3 where the AP has at least one steerable antenna (but could have more) and one laser that is mounted on the AP using an adjustable mount that can reorient the laser to generate laser patterns that visually represent the locations of multiple coverage areas of the antenna when pointed in different directions.

While the embodiments herein are primarily discussed in the context of large public venues, they are not limited to such. The embodiments herein can be used in office settings, educational institutions, shopping centers, outdoor areas, and the like to visualize the coverage areas of a steerable antenna in an AP.

At block 410, the technician activates a laser attached to the AP having a first orientation relative to the AP. For example, the laser may be at a default position (e.g., orientated along the center axis of the AP). Activating the laser causes it to generate a laser pattern (e.g., the crosshairs shown in FIG. 3) that represent the location and size of the coverage area of the antenna if it were steered in the same direction as the laser. The technician can either manually activate the laser (e.g., press an on switch on the laser) or use a portable device with a software application to instruct the AP to turn on the laser.

The technician can then visually inspect the laser pattern and see if it provides the desired coverage area for the antenna. For example, the technician may determine whether the laser pattern is close to, or overlaps, a laser pattern generated by a laser on a neighboring AP, thereby indicating there are no gaps between their coverage areas. Or the technician may determine whether the laser pattern covers a particular area of interest in the venue (e.g., an entrance, walkway, VIP seating area, etc.).

The method 400 assumes that the technician has determined that the laser pattern does not correspond to the desired coverage area, and in response, at block 415 the technician adjusts the laser to have a second orientation relative to the AP. In one embodiment, the technician physically adjusts the orientation of the laser. For example, the technician may use a mechanical system in the adjustable mount (e.g., the adjustable mount 310) to reorient the laser. The mechanical system can include springs, tension elements, ball and socket, levers, and any other element to enable the technician to pivot, rotate, slide, or otherwise change the direction in which the laser is pointing.

In another embodiment, the technician may adjust the orientation of the laser using an automatic adjustment system that includes one or more actuators in the adjustable mount. For example, the technician may use a portable device to instruct the adjustable mount to reorient the laser. The portable device may include a list of defined settings which the technician can select (e.g., 20 degrees to left, 10 degrees to the left, 0 degrees, 10 degrees to the right, and 20 degrees to the right) to change the orientation of the laser. Thus, the technician does not have to be physically present at the AP in order to reorient the laser.

After adjusting the laser, the technician can then reevaluate the laser pattern to determine whether it corresponds to the desired coverage area. If so, at block 420, the technician steers the antenna to change the location of its coverage area to correspond to the second orientation of the laser. That is, the technician steers the antenna to point in the same (or similar) direction as the laser.

The embodiments herein are not limited to any particular technique for steering the antenna. This can be done by the technician using an interface on the AP when the technician is at the location of the AP, or by using a software application on a portable device that is wirelessly connected to the AP. Thus, the technician may not have to be at the physical location of the AP in order to adjust the steerable antenna.

The method 400 can be used to adjust multiple steerable antennas on the same AP. For example, the method 400 can be repeated to adjust the same laser to identify an optimal direction to steer a second antenna in the AP. For instance, the same laser can be used to steer two antennas in the APs so that their coverage areas contact (or slight overlap) so there are no coverage gaps. The coverage areas of the antennas on the AP can also be set in consideration of coverage areas provided by antennas on different APs so there are no gaps between any of the coverage areas of the APs.

Figure 5:
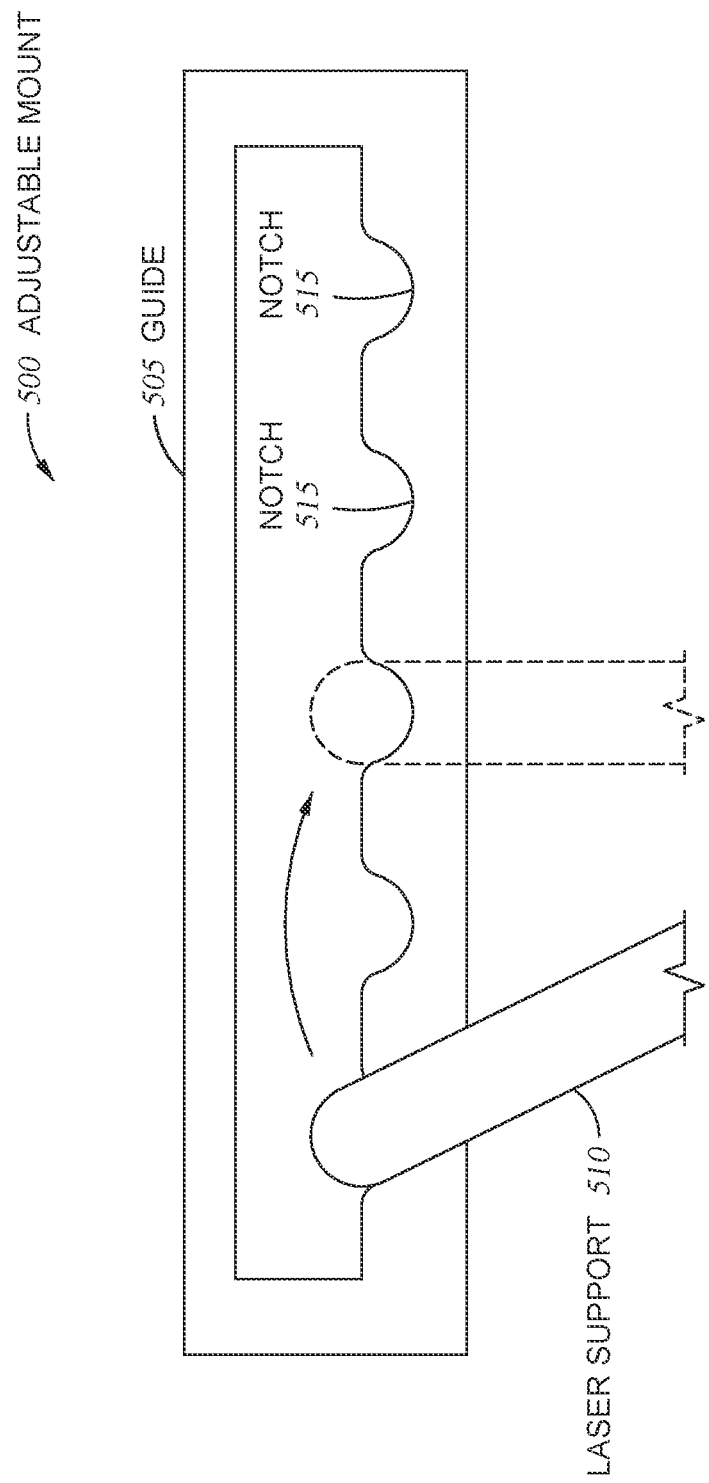
FIG. 5 illustrates a guide for adjusting a laser mounted on an AP, according to one embodiment.

FIG. 5 illustrates a guide 505 on an adjustable mount 500 for adjusting a laser mounted on an AP, according to one embodiment. For example, the adjustable mount 500 may be one example of the adjustable mount 310 in FIG. 3. In this embodiment, the guide 505 includes five notches 515 that provide settings for the laser (not shown). The adjustable mount 310 includes a laser support 510, to which the laser is fixedly mounted. The technician can then move (e.g., slide) the laser support 510 between the notches 515 to reorient the laser. For example, each of the notches 515 can correspond to one of the five laser patterns 125 shown in FIG. 3. When the technician moves the laser support 510 to the far left notch 515, then the laser generates the laser pattern 125E in FIG. 3. When the technician moves the laser support 510 to the notch 515 that is the second from the left, then the laser generates the laser pattern 125D in FIG. 3, and so forth. Thus, the guide 505 provides predefined settings (e.g., the notches 515) that permit the technician to adjust the location of the laser pattern.

The technician can then use the method 400 to adjust the orientation of the laser until the laser pattern corresponds to the desired coverage area. For example, the technician can move the laser support 510 to the five notches 515 to find the orientation of the laser that results in a laser pattern that best matches the desired location of the coverage area. The technician can then steer the antenna depending on which notch 515 the laser support 510 is currently disposed in. For example, FIG. 5 illustrates moving the laser support 510 from the far left notch 515 to the middle notch 515 (shown in slashed lines). If this causes the laser pattern to be located in the desired location of the coverage area, the technician can then steer the antenna so it points in the same direction as the laser (e.g., along the center axis of the AP).

Figure 6A:
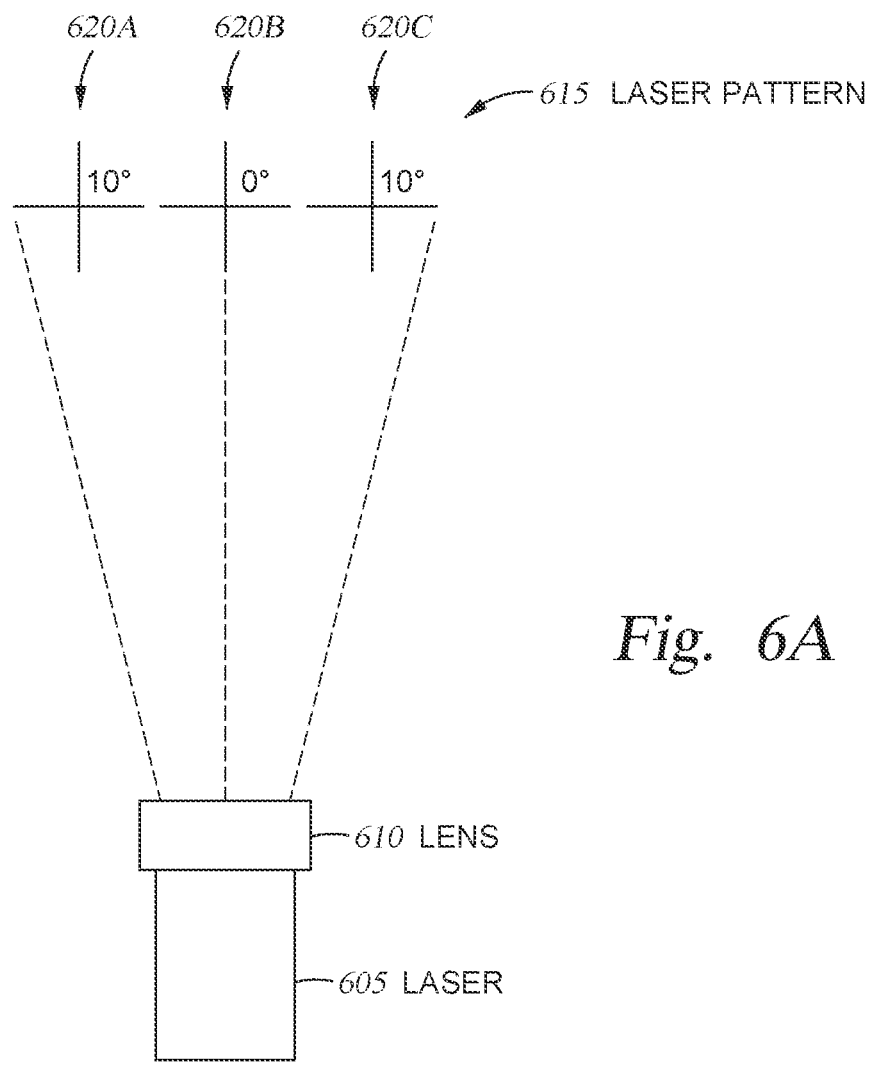
FIGS. 6A and 6B illustrate using a lens to illustrate different coverage areas of a steerable antenna, according to one embodiment.
Figure 6B:
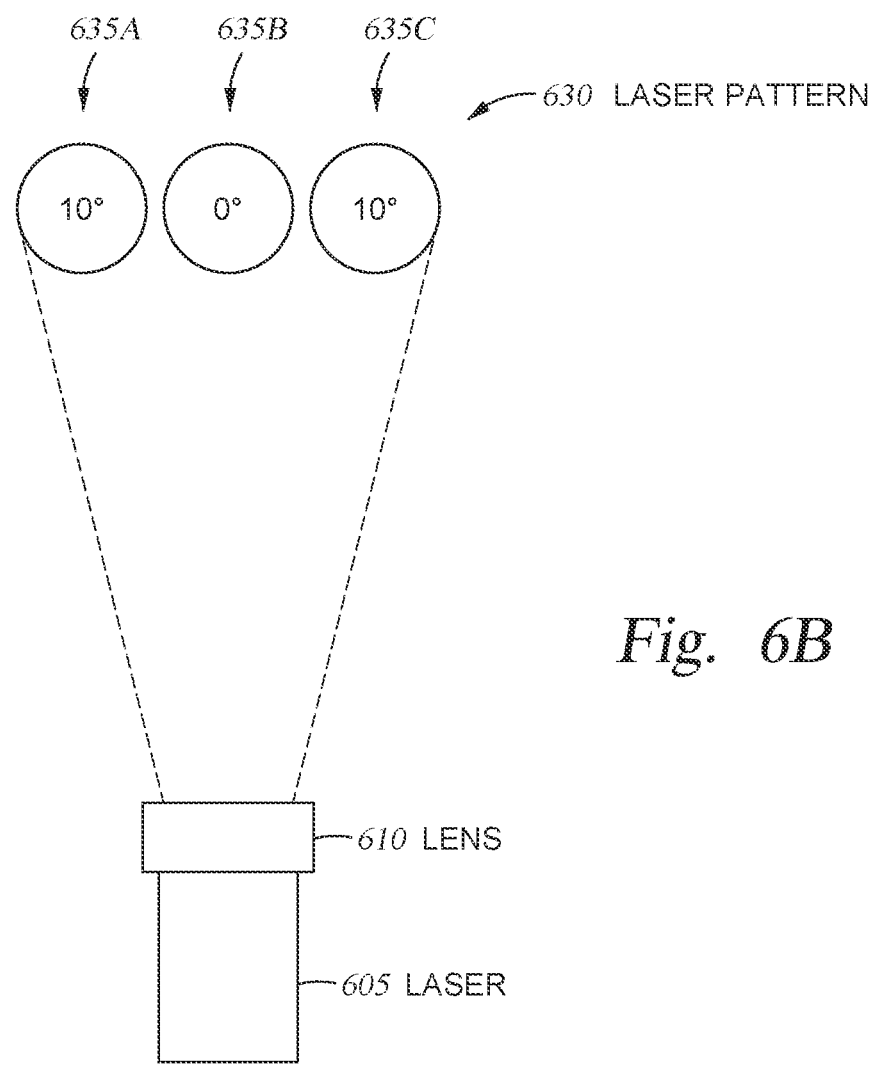

FIGS. 6A and 6B illustrate using a lens 610 to illustrate different coverage areas of a steerable antenna, according to one embodiment. FIG. 6A illustrates the lens 610 attached to a laser 605. The lens 610 (e.g., a Powell lens) disperses a collimated beam generated by the laser 605 to output the laser pattern 615. Unlike in FIGS. 1 and 3 where each laser outputs only one crosshair at a time, using the lens 610, the laser 605 can output the laser pattern 615 which has multiple crosshairs. In this example, the laser pattern 615 includes three crosshairs 620A-C which each corresponds to different locations of a coverage area of a steerable antenna. That is, the crosshair 620A corresponds to a location of the coverage area of the antenna when steered 10 degrees to the left, the crosshair 620B corresponds to a location of the coverage area of the antenna when steered along the center axis of the AP, and the crosshair 620C corresponds to a location of the coverage area of the antenna when steered 10 degrees to the right.

When the laser 605 is activated, the three crosshairs 620 are displayed simultaneously. Advantageously, this mean fewer (or only one) laser may be used, unlike in FIG. 1 where each laser pattern corresponds to one laser. Or, when compared to FIG. 3, the adjustable mount can be omitted since the laser 605 can emit the laser patterns 125A-E using the lens 610 without changing orientations. However, one possible disadvantage of using the lens 610 is that a more powerful laser may be needed in order for the pattern 615 to include multiple crosshairs 620, especially as the distance from the AP to the floor of the venue increases.

FIG. 6B illustrates attaching a different lens 625 attached to the laser 605. The lens 625 (e.g., a Powell lens) disperses a collimated beam generated by the laser 605 to output a different laser pattern 630 than in FIG. 6A. In this example, the laser pattern 630 includes circular (or elliptical) location identifiers 635 (e.g., circles or ellipses). In one embodiment, the circular location identifiers 635 correspond to the location of the coverage area (e.g., the 3 dB boundary of the main lobe) when the beam is steered in the corresponding directions. That is, the identifier 635A corresponds to a location of the coverage area of the antenna when steered 10 degrees to the left, the identifier 635B corresponds to a location of the coverage area of the antenna when steered along the center axis of the AP, and the identifier 635C corresponds to a location of the coverage area of the antenna when steered 10 degrees to the right.

When the laser 605 is activated, the three identifiers 635C are displayed simultaneously. While FIGS. 6A and 6B illustrate using crosshairs and circular identifiers to represent different coverage areas of a steerable antenna, other shapes and symbols can be used. For example, the laser pattern may include only a vertical line, or only a horizontal line, at the different coverage area locations. Or the laser pattern may include a dot that represents the center of the coverage area when the antenna is steered in the corresponding direction.

Figure 7:
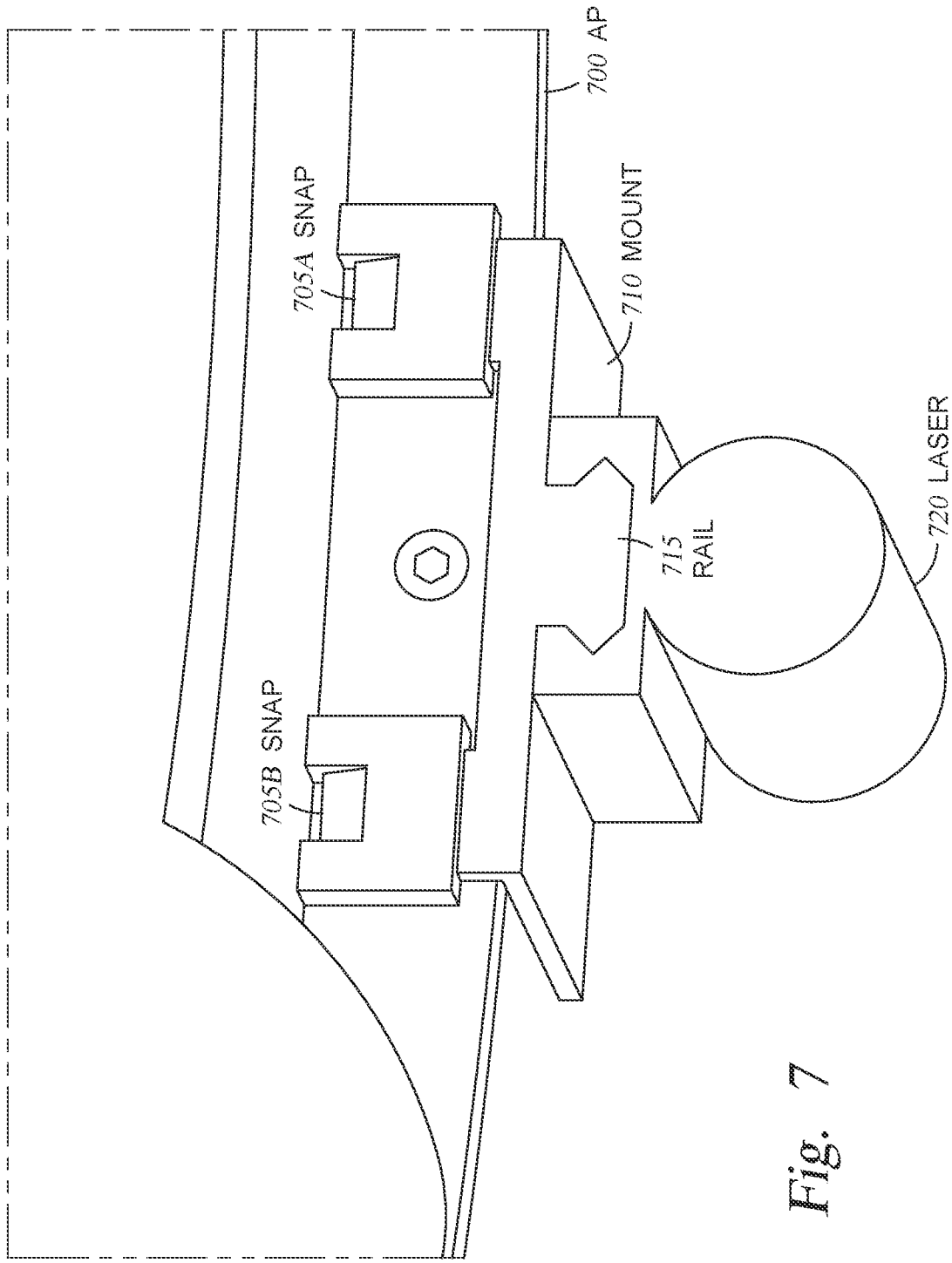
FIG. 7 illustrates a laser attachment system, according to one embodiment.

FIG. 7 illustrates a laser attachment system, according to one embodiment. In this example, a mount 710 is used to attach a laser 720 to an AP 700. The mount 710 includes snaps 705 for coupling to the AP 700. The AP 700 includes female members that receive the male members of the snaps 705 to fasten the mount 710 to the AP 700. To remove the mount 710 from the AP 700, the male members can be pressed so the snaps 705 move towards the AP 700 and the mount 710 can be slid downwards.

The mount 710 includes a rail 715 (e.g., a Picatinny rail) for attaching the laser 720 to the mount. That is, the laser 720 includes a portion that slides onto the rail 715. Doing so aligns the laser 720 to the AP 700. For example, when mounted onto the rail 715, the laser may be aligned with the center axis of the AP 700.

In one embodiment, the mount 710 is adjustable as discussed in FIGS. 3-5 so that the laser 720 can be reoriented to point in different directions. In another embodiment, several mount 710/laser 720 combinations may be attached to the AP 700 where each combination points in a different direction. This can be used to form the system in FIG. 1 where each laser points in a different direction. For example, rails 715 in the mounts 710 may have different orientations when attached to the AP that result in the corresponding lasers pointing in the different directions illustrated in FIG. 1.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   mounting an access point (AP) to a structure, the AP comprising a steerable antenna and a plurality of lasers oriented in different directions relative to the AP;
   activating a first laser of the plurality of lasers, wherein the first laser projects light on a first surface to provide a visual indication of a first location of a coverage area of the steerable antenna when steered in a same direction as the first laser;
   activating a second laser of the plurality of lasers, wherein the second laser projects light on a second surface to provide a visual indication of a second location of the coverage area of the steerable antenna when steered in a same direction as the second laser; and
   steering the steerable antenna to change the location of the coverage area after activating the first and second lasers.

2. The method of claim 1, wherein the steerable antenna is electronically steerable.

3. The method of claim 1, wherein the steerable antenna is physically steerable without having to change an orientation of the AP.

4. The method of claim 1, wherein the first and second lasers project light that forms crosshairs where ends of the crosshairs indicate sizes of the coverage area of the steerable antenna at the first and second surfaces.

5. The method of claim 1, wherein the first and second lasers project light that forms an ellipse or circle where the ellipse or circle indicates sizes of the coverage area of the steerable antenna at the first and second surfaces.

6. The method of claim 1, further comprising:
   steering a second steerable antenna in the AP after activating the first and second lasers, wherein the coverage area of the steerable antenna and a coverage area of the second steerable antenna at least partially overlap.

7. The method of claim 1, wherein the first and second lasers are activated using a software application executing on a portable device that is wirelessly connected to the AP.

8. A method, comprising:
   mounting an access point (AP) to a structure, the AP comprising a steerable antenna and a laser;

activating the laser when having a first orientation relative to the AP, wherein the laser projects light on a surface to provide a visual indication of a location of a coverage area of the steerable antenna when steered in a same direction as the laser;

adjusting the laser to have a second orientation relative to the AP; and steering the steerable antenna to change the location of the coverage area after adjusting the laser.

9. The method of claim 8, wherein the steerable antenna is electronically steerable.

10. The method of claim 8, wherein the steerable antenna is physically steerable without having to change an orientation of the AP.

11. The method of claim 8, wherein the laser projects light that forms a crosshair where ends of the crosshair indicate a size of the coverage area of the steerable antenna at the surface.

12. The method of claim 8, wherein a Powell lens is attached to the laser to project multiple (i) crosshairs or (ii) multiple ellipses, each indicating a respective location of the coverage area of the steerable antenna.

13. The method of claim 8, further comprising:

steering a second steerable antenna in the AP after adjusting the laser, wherein the coverage area of the steerable antenna and a coverage area of the second steerable antenna at least partially overlap.

14. The method of claim 8, wherein the laser is activated and adjusted using a software application executing on a portable device that is wirelessly connected to the AP.

15. A system, comprising:

an AP comprising a steerable antenna;

a first laser mounted on the AP, the first laser has an orientation relative to the AP such that, when activated, the first laser projects light on a first surface to provide a visual indication of a first location of a coverage area of the steerable antenna when steered in a same direction as the first laser; and a second laser mounted on the AP, the second laser has an orientation relative to the AP such that, when activated, the second laser projects light on a second surface to provide a visual indication of a second location of the coverage area of the steerable antenna when steered in a same direction as the second laser.

16. The system of claim 15, wherein the steerable antenna is electronically steerable.

17. The system of claim 15, wherein the steerable antenna is physically steerable without having to change an orientation of the AP.

18. The system of claim 15, wherein the first and second lasers project light that forms crosshairs where ends of the crosshairs indicate sizes of the coverage area of the steerable antenna at the first and second surfaces.

19. The system of claim 15, wherein the first and second lasers project light that forms an ellipse or circle where the ellipse or circle indicates sizes of the coverage area of the steerable antenna at the first and second surfaces.

20. The system of claim 15, further comprising:

a second steerable antenna, wherein the first and second lasers, when activated, provide visual indications of locations of a coverage area of the second steerable antenna when pointing in the same directions as the first and second lasers.

* * * * *